United States Patent
Abileah

(10) Patent No.: US 9,639,756 B2
(45) Date of Patent: May 2, 2017

(54) VISIBILITY OF TARGETS ON AND BELOW THE OCEAN SURFACE

(71) Applicant: Ron Abileah, San Carlos, CA (US)

(72) Inventor: Ron Abileah, San Carlos, CA (US)

(*) Notice: Subject to any disclaimer, the term of this patent is extended or adjusted under 35 U.S.C. 154(b) by 67 days.

(21) Appl. No.: 14/631,756

(22) Filed: Feb. 25, 2015

(65) Prior Publication Data
US 2016/0247011 A1 Aug. 25, 2016

(51) Int. Cl.
*G06K 9/00* (2006.01)

(52) U.S. Cl.
CPC .................. *G06K 9/0063* (2013.01)

(58) Field of Classification Search
CPC ... G06K 9/0063; G01S 13/426; G01S 13/534; G01S 13/726; G01S 13/86; G01S 7/021; G01S 7/022
See application file for complete search history.

(56) References Cited

U.S. PATENT DOCUMENTS

| 8,903,134 B2 | 12/2014 | Abileah | |
| 2015/0302567 A1* | 10/2015 | Patterson | G06T 5/50 382/191 |

OTHER PUBLICATIONS

D. Hamilton and J. Ward, "Online access to NODC information services", Proc. OCEANS '88—A Partnership of Marine Interests, vol. 2, Baltimore, MD, USA, Oct. 31-Nov. 2, 1988, pp. 637-640.*
S. Kay, J.D. Hedley, and S. Lavender, "Sun Glint of High and Low Spatial Resolution Images of Aquatic Scenes: a Review of Methods for Visible and Near-Infrared Wavelengths," Remote Sens., 1, 697-730, 2009, doi:10.3390/rs1040697.
V. Klemas, "Remote Sensing of Coastal and Ocean Currents: An Overview," J. Coastal Research 2012, 282, 576-86.

* cited by examiner

*Primary Examiner* — Bhavesh Mehta
*Assistant Examiner* — Ian Lemieux
(74) *Attorney, Agent, or Firm* — Moore Patents; David Dreyfuss

(57) ABSTRACT

A pair of images is obtained having pixel intensities substantially proportional to wave height for a majority of pixels. The images are aligned, orthorectified, and adjusted for relative reflectance in their respective spectral bands. The images are Fourier transformed, and then one image is propagated to the time of the other image. A deglinted image is calculated by taking the difference in wavenumber space, then inverse Fourier transforming. Alternatively, an equivalent formula can be obtained using convolutions. The propagation uses a gravity wave propagation function, which, in general, can be a function of depth, surface current, and wave direction which can be obtained from external data, assumed constant, or calculated from wave images depending on the particular circumstances.

20 Claims, 9 Drawing Sheets

Wave field at t = 0 s

Wave field at t = 3 s

A  B

VISIBILITY OF TARGETS ON AND BELOW THE OCEAN SURFACE

CROSS-REFERENCE TO RELATED APPLICATIONS

This application is related to U.S. Pat. No. 8,903,134 issued Dec. 2, 2014 from U.S. patent application Ser. No. 13/091,345 filed Apr. 21, 2011, which claims priority from U.S. Provisional Patent Application No. 61/400,037, filed Jul. 21, 2010, which are incorporated herein by reference for all purposes.

FIELD OF THE INVENTION

One or more embodiments of the present invention relate to improving the visibility of targets on and below the surface of a body of water using images of the water surface.

BACKGROUND

Down-looking images of water bodies (e.g., lakes, oceans) are used to find, identify, and characterize objects below and on the water surface. Some well-known applications are: benthic mapping in shallow waters, measuring chlorophyll levels, locating navigational hazards, locating ordinance (e.g., mines), ship wrecks, marine life, maritime search and rescue, monitoring the health of coral reefs, detecting small vessels and their wakes, and tracking oil slicks. Satellite images were used to search large areas of ocean for debris related to the Mar. 8, 2014 disappearance of Malaysian Airlines flight MH370.

The reflection of sunlight and skylight from the waves obscures details and makes target viewing more difficult. Deglinting algorithms are used to subtract out the wave clutter. Kay et al. (S. Kay, J. D. Hedley, and S. Lavender, "Sun Glint of High and Low Spatial Resolution Images of Aquatic Scenes: a Review of Methods for Visible and Near-Infrared Wavelengths," Remote Sens., 1, 697-730, 2009, doi:10.3390/rs1040697) is an excellent review of previously known deglinting algorithms.[1]

[1] "Deglinting" is the common term used for removing sunlight reflection. The Hedley, Lynzenga, Hochberg, and Goodman algorithms (Kay et al., Sections 5.2-5.5) are the methods most closely related to the algorithms described herein.

While there are variations among the current algorithms, they all use two images: an image S, with visibility of both waves and the objects of interest, and another image R, that also has visibility of waves but little or no visibility of the objects. Subtracting the latter image from the first image removes the surface waves, or deglints:

$$S'(\vec{x}) = S(\vec{x}) - \beta R(\vec{x}), \quad (1)$$

where the result $S'(\vec{x})$, is the deglinted version of input image S, $\vec{x}$ a pixel location, and $\beta$ is the ratio of the ocean surface reflected radiance in S to the radiance in R.

For objects below the ocean surface, image S is obtained using a water-penetrating spectral band (usually blue-green) and R is obtained using a non-water penetrating band (red or infrared). For objects on the surface, the bands may be reversed since surface objects are often "brighter" in the infrared spectrum than in blue-green.

Eqn. 1 implicitly assumes that the two images are simultaneous in time. This is generally not the case with present day satellite imagers. Most use push broom scanners with several staggered linear array detectors, one line array for each spectral band. There is a small (0.3 to 2 s) but significant time difference between the times when each array passes over a fixed point on Earth.[2] There are also time delays in "persistent surveillance mode" where consecutive images are made by repointing the imaging array to rescan an area of interest. Time delays in persistent surveillance mode are typically 10-30 s. Since waves are constantly moving, a time delay between the two images results in misalignment of the wave patterns and incomplete deglinting.

[2] Some examples: French SPOT moderate resolution imaging satellite: 2 s delays between panchromatic and multispectral, US Landsat 8: 1 s delay between visible and deep infrared image. The high-resolution Worldview 2 and 3 satellites have inter-band delays of up to 0.35 s.

SUMMARY OF THE INVENTION

A pair of images is obtained having pixel intensities substantially proportional to wave height for a majority of pixels. The images are aligned, orthorectified, and adjusted for relative reflectance in their respective spectral bands. The images are Fourier transformed, and then one image is propagated to the time of the other image. A deglinted image is calculated by taking the difference in wavenumber space, then inverse Fourier transforming. Alternatively, an equivalent formula can be obtained using convolutions. The propagation uses a gravity wave propagation function, which, in general, can be a function of depth, surface current, and wave direction which can be obtained from external data, assumed constant, or calculated from wave images depending on the particular circumstances.

DETAILED DESCRIPTION

Figure 1:
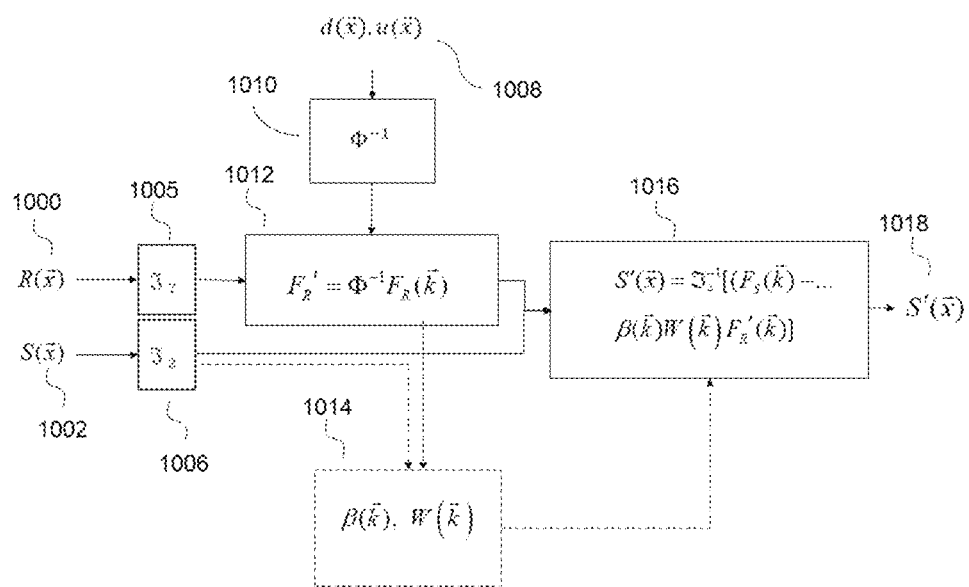
FIG. 1 shows an exemplary deglinting algorithm according to an embodiment.

Before the present invention is described in detail, it is to be understood that unless otherwise indicated this invention is not limited to specific bodies of water or specific imaging modalities. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a sensor" includes two or more sensors, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Where the term "image" is used herein, it is understood that the image may be either a visual representation or an analog or digital numerical representation thereof. Images are obtained from an "imaging system." The original sensor may or may not be optical. For example, an image can be a visual or numerical representation of radar data. Images may be "obtained" by any suitable means. In some cases an imaging system may include a camera on an aircraft, Earth orbiting satellite, or a mast. In other embodiments, the images may be obtained by, for example, receiving or purchasing the image data from an image provider, for example, a provider with access to images or who owns a satellite-mounted camera. Similarly, images may be obtained by retrieving images from a library of stored images.

The term "frame" as used herein refers to one member of a set of images obtained at quasi-regular time intervals $\tau$. The time interval may also vary depending on the type of imaging device.

The term "deglint" as used herein refers to a process applied to an image whereby the effect of light or radar scattering from water waves is reduced or removed. The scattering may be from an irregular surface such as ocean surface waves that tends to reduce visibility of other image features.

The term "target" as used herein refers to an object in an image which a user wishes to be able to see. A target is distinguished from "clutter" which tends to obscure the visibility of a target in an image. For example, ocean waves can represent clutter in an image where the user wishes to see other objects on or below the ocean surface.

The methods disclosed herein will generally be described using examples for ocean waves, but can be applied, in principle, to any body of water with surface waves. The surface waves are typically generated by local wind but may also be swell waves from distant storms, or Kelvin wakes of vessels.

It is assumed, as is common for any remote imaging of the Earth surface, that preliminary sensor-specific image processing ("preconditioning") is applied including ortho-rectification to Earth coordinates. There may also be corrections for camera distortions, pixel gain variations, bad pixel replacement with interpolations, and adjustments for image nonlinearities. In the case of images formed by radar, there may be a compensation for the radar range-equation. In optical images, adjustments can be made for cloud shadows and whitecaps. Further details of preconditioning steps are described in U.S. Pat. No. 8,903,134, incorporated by reference herein. The images are mapped using a grid of fixed-Earth coordinates, and the pixel intensities at locations where only the water surface is imaged have a near linear relationship to wave height.

In a previous invention described in U.S. Pat. No. 8,903,134, the instant inventor introduced a frame differencing with a wave propagation kernel that adjusted the waves in a second image to match the waves in a first:

$$S'(\vec{x}) = \mathfrak{I}_2^{-1}[(F_S(\vec{k}) - \Phi^{-1} F_R(\vec{k}))], \quad (2)$$

where the images are Fourier transformed into their respective complex wavenumber spectra, $F_S(\vec{k})$, $F_R(\vec{k})$ and differenced in the wavenumber domain;[3] $\vec{k}$ denotes wavenumbers. The wave propagation kernel, $\Phi^{-1}$, accounts for the time delay between the two images with the gravity wave dispersion law (described more fully below).[4] The kernel is generally a function of the water depth and surface currents, which may vary across the images. The inverse Fourier transform operator, $\mathfrak{I}_2^{-1}$, restores the real-space image, with waves subtracted.

[3] The mathematical notation used here is as close as possible to notation in U.S. Pat. No. 8,903,134. One minor departure is in the notation of the Fourier transforms. The $F_1$ and $F_2$ in U.S. Pat. No. 8,903,134 are the same as $F_S$ and $F_R$ used here. The change is to remind the reader of the distinct roles of the S and R images, the first to image the target, the second to remove clutter. In U.S. Pat. No. 8,903,134, the two images are interchangeable; here they are not generally interchangeable.

[4] $\Phi^{-1}$ refers to the propagation operator propagating waves one time step ($\tau$) backwards in time. Conversely $\Phi^{+1}$ would propagate waves forward in time. $\Phi^{-m}$ is the backwards propagation for m time steps (m$\tau$). Since only $\Phi^{-1}$ is used here, the '-1' in the notation is superfluous. The notation is used for continuity with the prior invention.

In U.S. Pat. No. 8,903,134, the minimization of Eqn. 2 is used to find the depth and current at each pixel location $\vec{x}$. The two images were assumed to be from the same imaging system, and in the case of multispectral imaging, also the same spectral band. The $\beta$ term in Eqn. 1 was implicitly assumed to be 1. Now, including the $\beta$ term, the same formula can be used for deglinting, $$S'(\vec{x}) = \mathfrak{I}_2^{-1}[(F_S(\vec{k}) - \beta\Phi^{-1} F_R(\vec{k}))]. \quad (3)$$

Two optional but useful refinements can be incorporated into Eqn. 3: first, a wavenumber mask, $W(\vec{k})$ can be added to restrict subtraction to wavenumbers with significant wave energy, $$S'(\vec{x}) = \mathfrak{I}_2^{-1}[(F_S(\vec{k}) - W(\vec{k})\beta\Phi^{-1} F_R(\vec{k}))]. \quad (4)$$

Second, $\beta$ can be made wavenumber dependent, $$S'(\vec{x}) = \mathfrak{I}_2^{-1}[(F_S(\vec{k}) - W(\vec{k})\beta(\vec{k})\Phi^{-1} F_R(\vec{k}))]. \quad (5)$$

Embodiments of the instant invention can be used for various applications where the goal is to better image targets located in the water column, on the ocean bottom, or on the surface. Embodiments of the instant invention incorporate the two-image subtraction directly so that the time shift can be accommodated by appropriate spatial shift of each wavenumber. Significantly, the algorithm accounts for the depth and current on a pixel-by-pixel basis so deglinting is done optimally even in shallow waters.

The method of deglinting will now be described for one pair of images, S and R. The process will produce a deglinted image S'. More than two images can be combined after frame differencing. Such implementation variations would be apparent to the ordinary engineer. There could for example be simple averaging of S outputs to average out camera noise and further improve the visibility of the object of interest. If the object of interest is moving (a marine mammal, a small vessel) the fusion of multiple S' outputs may be a form of moving target tracker. If there is a significant change in geometric perspective from one image pair to another, the fusion may be a stereoscopic 3D reconstruction of the object.

In Eqns. 2-5, waves at one image time can be propagated to exactly match the waves at a later time using the propagation operator $\Phi^{-1}$. This operator is a function of depth, current, and wave direction sign:

$$\Phi_{\pm}^{-1}(d(\vec{x}),\vec{u}(\vec{x}))=e^{\pm i\omega_0(\vec{k}|d(\vec{x}),\vec{u}(\vec{x}))\tau} \quad (6a)$$

$$\omega_0(\vec{k}|d(\vec{x}),\vec{u}(\vec{x}))=\sqrt{g|k|\tanh(|k|d(\vec{x}))}-\vec{k}\cdot\vec{u}(\vec{x}) \quad (6b)$$

where d is the water depth, $\vec{u}$ is the current vector at location $\vec{x}$. The ± sign is set according to the wave direction: + if waves are moving left-to-right in the image space, − if right-to-left.

Embodiments of the instant invention utilize Eqn. 6 combined with one of the earlier described deglinting equations (Eqn. 3, 4 or 5). The following description provides details and guidelines for practical real-world implementations.

Figure 2:
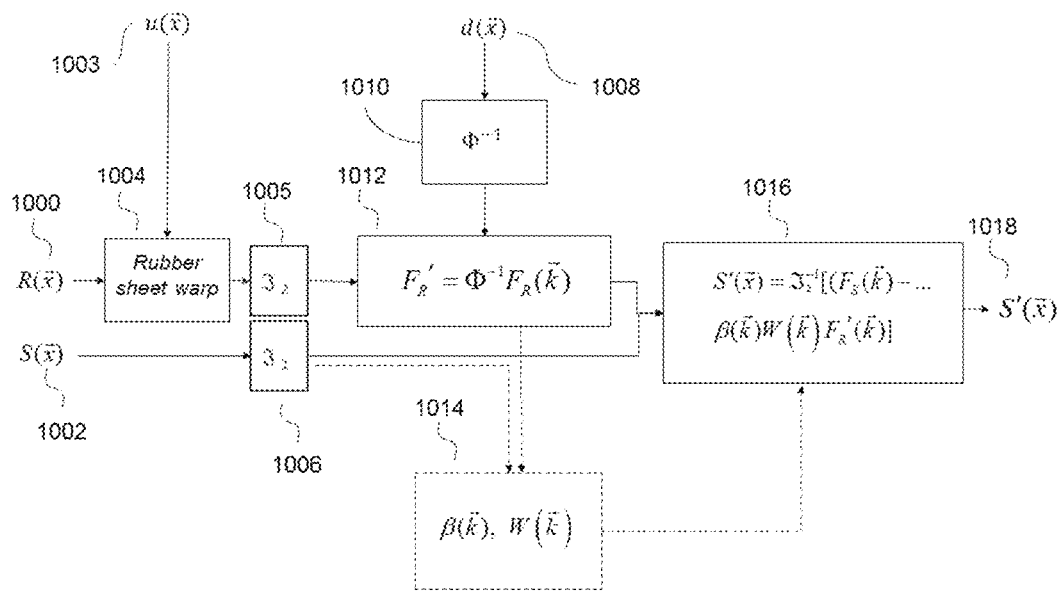
FIG. 2 shows a variation of the exemplary deglinting algorithm according to an embodiment.

FIG. 1 and FIG. 2 are flowcharts for two embodiments of the deglinting method. Both can be applied to any situation and will result in the same output, but one may be preferred over the other for computational efficiency. The embodiment shown in FIG. 1 is most suited (has the least computations) where there is little variation in depth and current over the image area. It is especially well suited for deep water areas (depth >30 m) where infinite depth can be assumed for all pixels. Generally, current will also vary little in deeper offshore areas and may be a constant over the image. The embodiment shown in FIG. 2 is more suitable closer to shore where depth and current can vary considerably. Other variants are possible combining the two embodiments in obvious ways.

With reference to FIG. 1, one embodiment of the deglinting method can now be described as follows. Images R 1000 and S 1002 are 2D Fourier transformed (steps 1005 and 1006) into $F_R$ and $F_S$. Maps of the depth and current vectors 1008 are input to compute $\Phi^{-1}$ (step 1010). The $\Phi^{-1}$ operator is applied (step 1012) to $F_R$ producing $F_R'$ effecting the wave propagation needed to align with the waves in $F_S$. $F_R'$ and $F_S$ may be combined (step 1014) to estimate the W and β terms. (This is one option, other ways will are discussed below.) $F_R'$ and $F_S$ are combined in step 1016 as in Eqn. 5 to produce deglinted image S' 1018.

If depth and current are constant over the image area, there is need for only one $\Phi^{-1}$ operator which is applied once to the entire image. Deglinting is fast and easy. But if depth and current vary, possibly requiring a unique $\Phi^{-1}$ for every image pixel, the process just described becomes computationally expensive.

With reference to FIG. 2, another embodiment of deglinting that is more practical for variable depth and currents can be described as follows. The input images are R 1000 and S 1002. Using externally supplied ocean current vectors 1003, image R is rubber-sheet warp transformed (step 1004) to adjust for the current induced wave advection, $$R(\vec{x})\leftarrow R(\vec{x}+\tau\vec{u}(\vec{x})). \quad (7)$$

The rest of the process is the same as in the first embodiment (FIG. 1) except that now ocean current can be assumed to be zero. The wave propagator needs only to account for depth. Removing the ocean currents reduces the remaining computational complexity by one or two orders of magnitude.

Depth Map

There are several ways to supply the needed depth map $d(\vec{x})$. The simplest is to use a constant or infinite depth. This is a reasonable assumption far away from shorelines. For shallow water areas, depth charts are available from commercial services and national hydrographic offices. Digitized depth maps are the most convenient input. The digital bathymetry maps should be interpolated to the image pixels and adjusted for the actual tide level relative to the datum used in the charts. Tide level may be from tide tables, tide prediction models, or measurements by coastal tide gages. Many tide gages are now reporting in near real time over the Internet.

Alternatively depth and current may be estimated from pairs of images as described in U.S. Pat. No. 8,903,134. They may even be the same two images used for deglinting.

Discretizing Depth Levels

There is a potential computation bottleneck if, for each pixel, there is a unique depth and hence a unique $\Phi^{-1}$ operator and corresponding inverse Fourier transform. For example, suppose the image is 1000×1000 pixels and there is a unique depth for each pixel. Following the prescription given above, the construction of a deglinted image requires applying the first unique depth value, inverse transform, saving the output of the one corresponding pixel, discarding all the rest; then applying the second unique depth value, inverse transforming, and saving a second output value, discarding the rest, and so forth. There would be a total of $10^6$ inverse Fourier transforms to construct the entire output S'. A far more sensible approach recognizes that one depth can be used as an approximation for all pixels within some range of depths. We define K depth bands, $[d_1\ d_2]$, $[d_2\ d_3]$, $[d_K\ d_{K+1}]$ The deglinting process is repeated at discretized depth values $$(\frac{[d_1+d_2]}{2}$$

for the first band $$\frac{[d_2+d_3]}{2}$$

for the second band, etc.). A deglinted image for each discrete depth is stored in the output for just those image pixels within the corresponding depth band. Results for pixels outside the corresponding depth range are discarded. The number of inverse Fourier transforms is K, which would typically be 3-100 and a considerable saving over $10^6$.

The optimum depth value set depends on the wind, sea state, image resolution, and time between images. It is left to the user to define an optimum set for specific conditions and applications. In lieu of specific details, Table I provides a few depth discretization schemes suitable for present day satellite images.

TABLE I

Discretized depth values for waves aligned to within 5% of their wavelength after propagation for time delay τ (suitable for wavelength 2-200 m).

| τ (sec) | Discretized depths (m) | | | | | | | | | | |
|---|---|---|---|---|---|---|---|---|---|---|---|
| 0.10 | 1.0 | 10.8 | 60.0 | | | | | | | | |
| 0.30 | 1.0 | 4.3 | 10.9 | 27.5 | 91.5 | | | | | | |
| 1.00 | 1.0 | 2.0 | 3.3 | 5.0 | 7.2 | 10.2 | 14.7 | 22.4 | 36.6 | | |
| 3.00 | 1.0 | 1.3 | 1.7 | 2.1 | 2.5 | 3.0 | 3.6 | 4.1 | 4.8 | 5.5 | 6.3 | 7.2 |
| | 8.2 | 9.3 | 10.6 | 12.2 | 14.2 | 16.6 | 19.7 | 23.6 | 28.7 | 35.5 | |
| 10.00 | 1.0 | 1.1 | 1.2 | 1.3 | 1.4 | 1.5 | 1.6 | 1.8 | 1.9 | 2.0 | 2.1 | 2.3 |
| | 2.4 | 2.6 | 2.7 | 2.9 | 3.0 | 3.2 | 3.3 | 3.5 | 3.7 | 3.9 | 4.0 | 4.2 |
| | 4.4 | 4.6 | 4.8 | 5.0 | 5.3 | 5.5 | 5.7 | 6.0 | 6.2 | 6.5 | 6.8 | 7.0 |
| | 7.3 | 7.6 | 8.0 | 8.3 | 8.6 | 9.0 | 9.4 | 9.8 | 10.2 | 10.7 | 11.2 | 11.7 |
| | 12.2 | 12.8 | 13.4 | 14.1 | 14.8 | 15.6 | 16.5 | 17.4 | 18.3 | 19.4 | 20.6 | |
| | 21.8 | 23.2 | 24.7 | 26.3 | 28.1 | 30.1 | | | | | | |

In instances where depth and current vary little or not at all over the image area, the $\beta(\vec{k})\Phi^{-1}$ terms in Eqn. 5 can be replaced with the complex transfer function[5] between R and S, using their respective Fourier transforms, The emphasis on complex calls attention to a distinction with Eqn. 10, which has a similar appearance but very different interpretation and utility.

$$\beta(\vec{k})\Phi^{-1} = \frac{\langle F'_R(\vec{k}) \rangle}{\langle F_S(\vec{k}) \rangle}. \tag{8}$$

In that case knowledge of the depth and current is not required. The complex transfer function incorporates both the wave propagation operator and scaling β. Even the time delay does not need to be known. Deglinting reduces to $$S'(\vec{x}) = \mathfrak{I}_2^{-1}\left[\left(F_S(\vec{k}) - W(\vec{k})\frac{\langle F'_R(\vec{k}) \rangle}{\langle F_S(\vec{k}) \rangle} F_R(\vec{k})\right)\right]. \tag{9}$$

The transfer function can be estimated directly from the images.

Current Map

Since the current map, $\vec{u}(\vec{x})$ can change on short time scales it is best to have the current determined as close in time to the images as possible. Currents are best estimated directly from the images used for deglinting using the method described in U.S. Pat. No. 8,903,134. See Eqns. 5, 6, and 7 therein, and the accompanying text for details.

Klemas (V. Klemas, "Remote Sensing of Coastal and Ocean Currents: An Overview," *J. Coastal Research* 2012, 282, 576-86) provides a good review of other resources for current maps. These include satellite thermal and synthetic aperture radar, coastal HF radars (good coverage in the USA, increasing number also covering other parts of the world), point current measurements by offshore wave and current buoys and networks of Acoustic Doppler Current Profilers (ADCPs), etc. There are commercially available and government supplied current predictions that can be used if nothing better is available.

Wave Direction

The wave direction is usually known. For example, along coastlines waves generally propagate towards the shore. Further off shore there are usually two prevailing wave systems, swell and wind waves. Swell waves (>100 m) may be heading in one direction, wind waves (<100 m) may be heading in another independent direction. Direction diversity is less of an issue closer to shore since all waves naturally refract to align with the coastline. There are publically available ocean wave hindcast/forecast models[6] that can be used to set wave direction.

For example from the NOAA WaveWatch web site polar.ncep.noaa.gov/waves/#ww3products If the direction is not known from external sources, it can be determined from a pair of images. See Eqn. 3 and the accompanying text in U.S. Pat. No. 8,903,134 for one approach that provides one wave direction sign for the entire image area.

Yet another way to determine direction is to use both $\Phi_+^{-1}$ and $\Phi_-^{-1}$ in Eqn. 5. The sign that minimizes the difference determines the wave direction and provides the best deglinting.

The β Factor

The common practice in prior art deglinting is constant β. Methods described in Kay et al., op.cit. can be used to estimate this constant.

In some embodiments, β can be more accurately estimated using the magnitude transfer function[7] between R and S, with the 2D Fourier transforms that are already at hand,

[7] The emphasis on magnitude makes a distinction from Eqn. 8.

$$\beta(\vec{k}) = \frac{|\langle F'_R(\vec{k}) \rangle|}{|\langle F_S(\vec{k}) \rangle|}. \tag{10}$$

The average over the wave support (pixels where the W mask is non-zero)

$$\beta = \langle \beta(\vec{k}) \rangle_w \tag{11}$$

provides a single, wavenumber independent value.

The Wave Mask W

The magnitude coherence function $$|\gamma(\vec{k})| = \frac{|\langle F'_R(\vec{k})F_S(\vec{k}) \rangle|}{|\langle F'_R(\vec{k}) \rangle||\langle F_S(\vec{k}) \rangle|} \tag{12}$$

is a useful diagnostic of whether the image data is suitable for deglinting. The subtraction in deglinting may actually add more random noise power than it removes as clutter, with a net loss of target visibility. Where $|\gamma(\vec{k})|>0.7$ there is significant visibility improvement. By setting $W(\vec{k})=0$ wherever $|\gamma(\vec{k})|<0.7$, the addition of unwanted noise can be avoided.

The wave mask W can also be heuristically designed as a pass band for all wavenumbers in a range of wave directions and wavelength, $$W(\vec{k}) = 1 \text{ for } \theta_{low} < \text{atan}\left(\frac{k_y}{k_x}\right) < \theta_{high}, k_{low} < |k| < k_{high} \quad (13)$$

where the direction and wavelength limits may be based on wave buoy measurement, or wave forecast/hindcast models as previously mentioned.

Convolution Method

Deglinting with the Fourier transforms can be replaced with deglinting using real-space convolutions. For example, Eqn. 4 can be computed with real space convolutions replacing the Fourier transform operations, $$S'(\vec{x})=(S(\vec{x})-b(\vec{x})\overline{\omega}(\vec{x})*\psi*R(\vec{x}) \quad (14)$$

where * denotes convolution, $\psi$ is a 2D kernel that propagates waves by a convolution on image R such that the waves are matched with image S. It performs the same function as $\Phi^{-1}$, but in a real space convolution. The $\overline{\omega}(\vec{x})$ term is the real-space equivalent of the wave mask W in wave-number space. The b term is the equivalent of $\beta$ and is most often a scalar constant for the entire image. However, $b(\vec{x})$ can accommodate variability: for example, there may be a different value for pixels in sunlight vs. pixels in cloud shadows. The convolution method may be preferred for a variety of reasons. The most common reason would be computational efficiency. The convolution method may be faster than Fourier transforms when dimensions of the kernels are much smaller than the image, for example, if the image dimensions are 1024×1024 and the convolution kernels can be truncated to 5×5.

Simulations

Embodiments of the instant methods have been tested on satellite optical images of ocean waves. However, evaluation cannot be truly complete without detailed and simultaneously acquired "truth" images, which are typically not available or are incomplete for real-world data.

At present, data simulations are the only precise way to prove and evaluate the algorithms. In simulations, we have complete control and knowledge of the depth and current field in every image pixel and the shape of the object hidden in the wave clutter. We can also easily model different ocean wave conditions such as wind waves with strong swell, high wind ocean spectrum, young sea, waves refracted or reflected back by land mass, etc.

Figure 3:
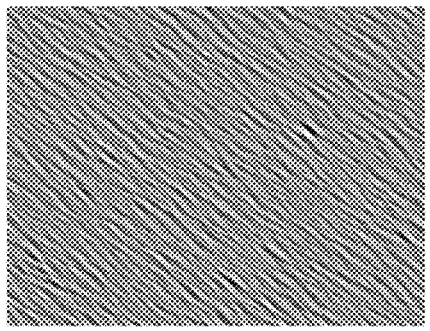
FIG. 3 shows a pair of simulated ocean wave images, 3 s apart.
Figure 3:
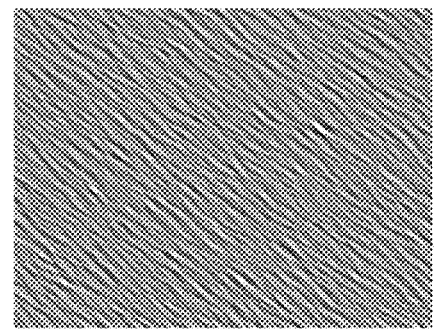

To illustrate the methods and discuss their accuracy, a simulation of a Pierson-Moskowitz ocean spectrum for a 10 m/s wind was used. Two images are simulated (FIG. 3), separated by 3 s. The image dimensions are 1024×1024. Pixel resolution is 0.5 m×0.5 m. (The image area is therefore 512 m×512 m.)

Figure 4A:
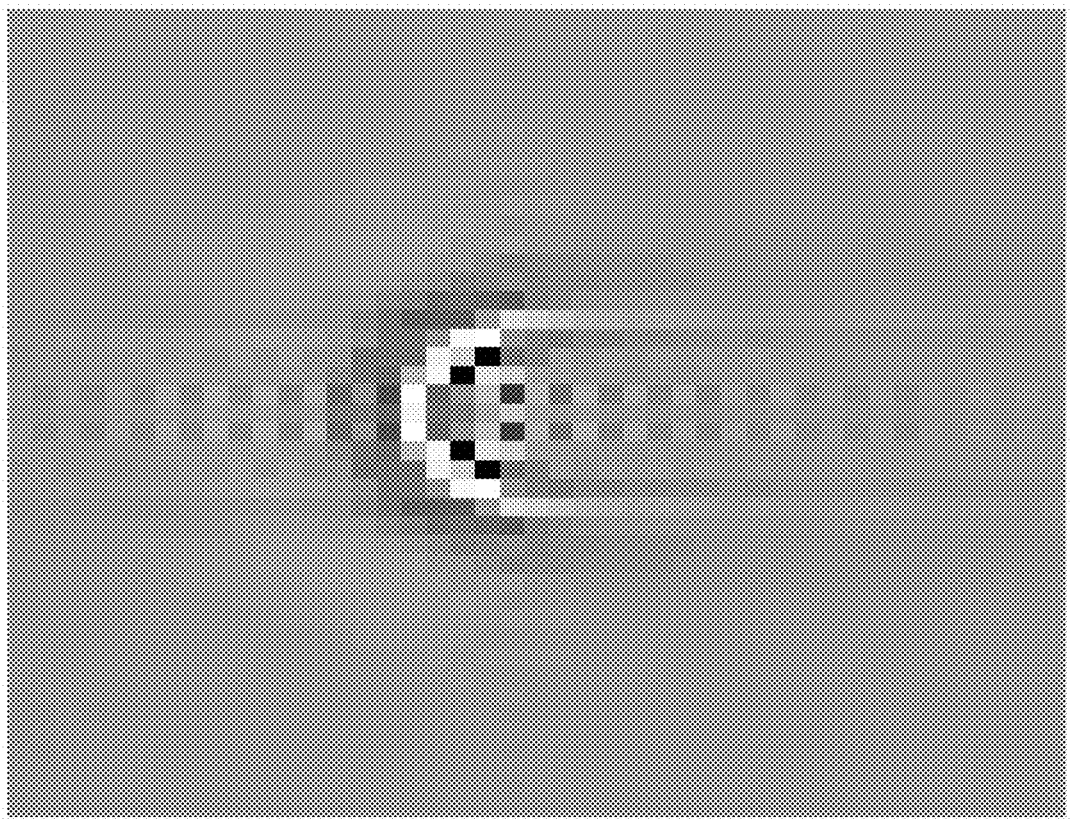
FIGS. 4A-C show a convolution kernel, and a pair of images differenced using convolutions.
Figure 4B:
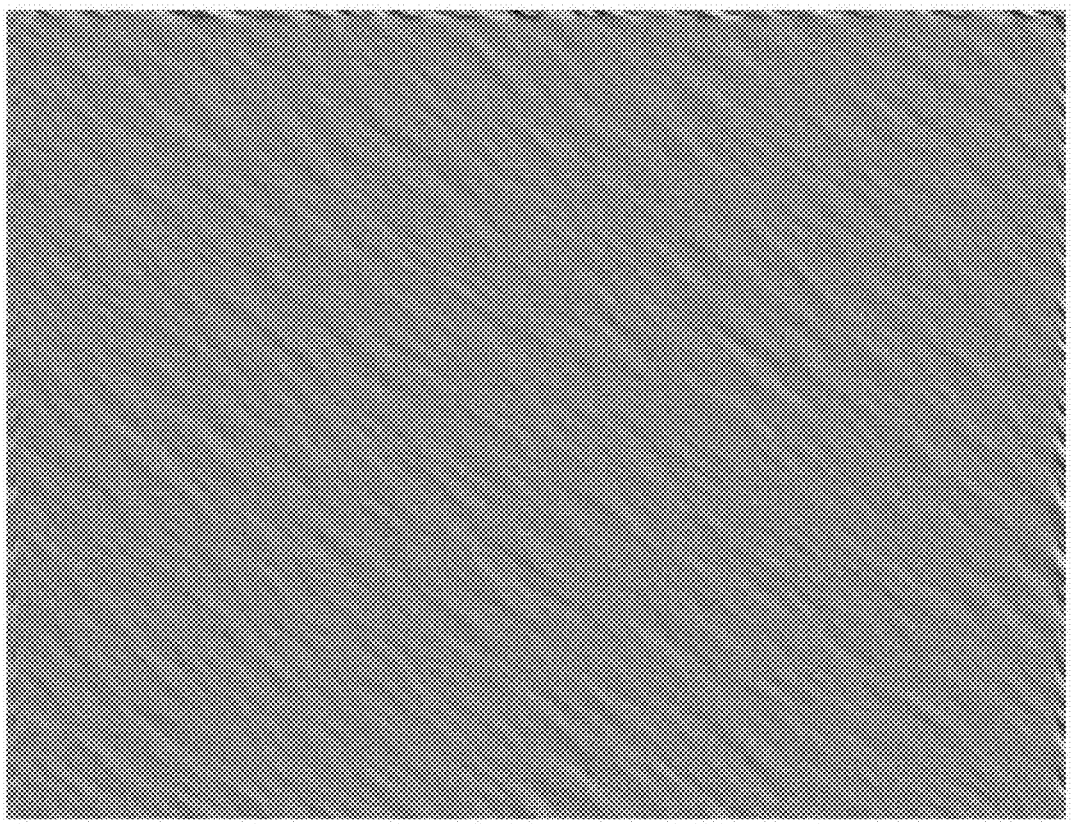
Figure 4C:
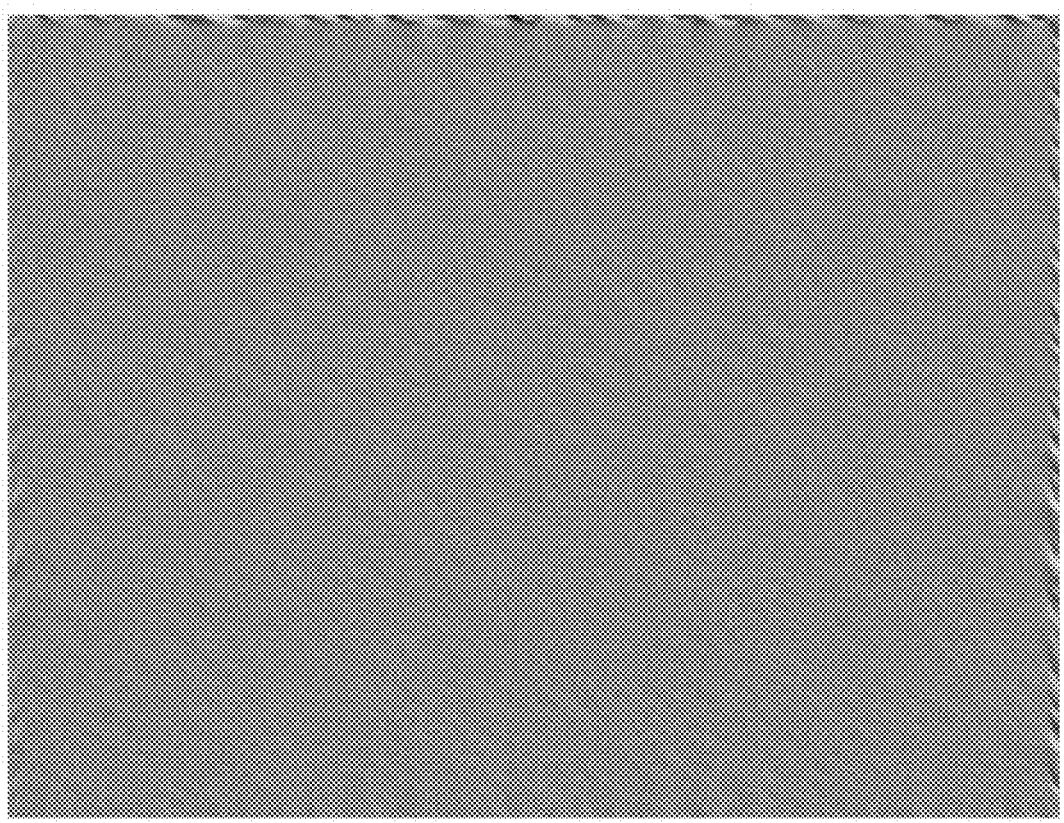

FIG. 4 illustrates the convolution method. FIG. 4A shows the convolution kernel, $\psi$ used in Eqn. 14. The kernel was computed for the same dimensions as the images, i.e., 1024×1024. However, FIG. 4A shows the kernel truncated to the central 43×43 portion. The kernel is mostly contained within those dimensions. FIG. 4B shows the deglinting with the 43×43 convolution. The subtraction removed most, but not all of the wave patterns. FIG. 4C, using 1023×1023 kernel, shows more complete subtraction of waves. In practice the size of the convolution kernel is a compromise between computational cost and deglinting performance. Smaller kernel size can be usually be used with little comprise in shallow (<6 m) depth, larger kernel dimensions are needed for deeper water, high wind speeds, and where there are multiple wave systems (e.g., wind waves and swell).

The example also shows residual waves in the wave around the edges of the image. This residual is a consequence of convolution assumes waves wraparound at the edges. In reality, waves are entering or emerging from the image footprint.

Figure 5:
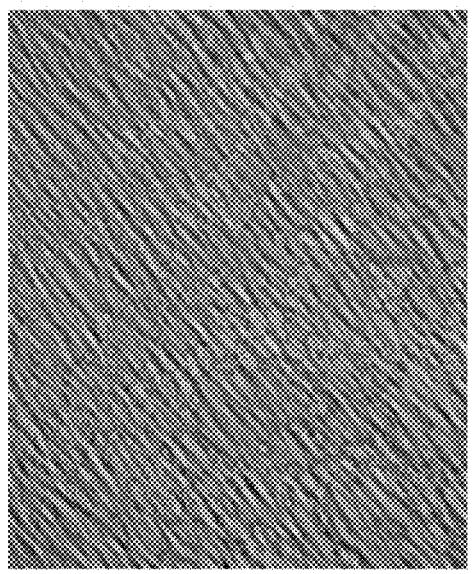
FIGS. 5A and B show before and after images for deglinting of a coral reef image using a combination of water-penetrating and non-penetrating spectral-band images.
Figure 5:
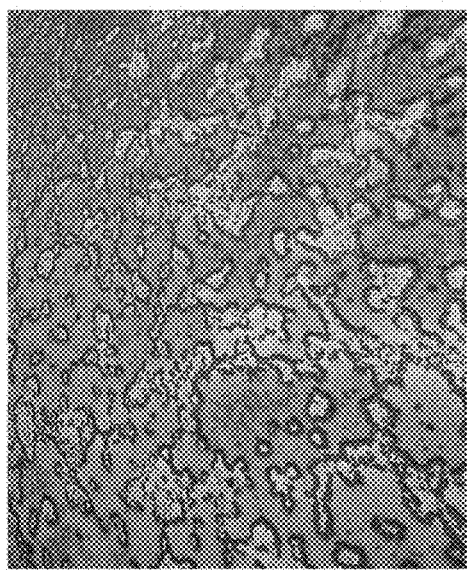
Figure 6:
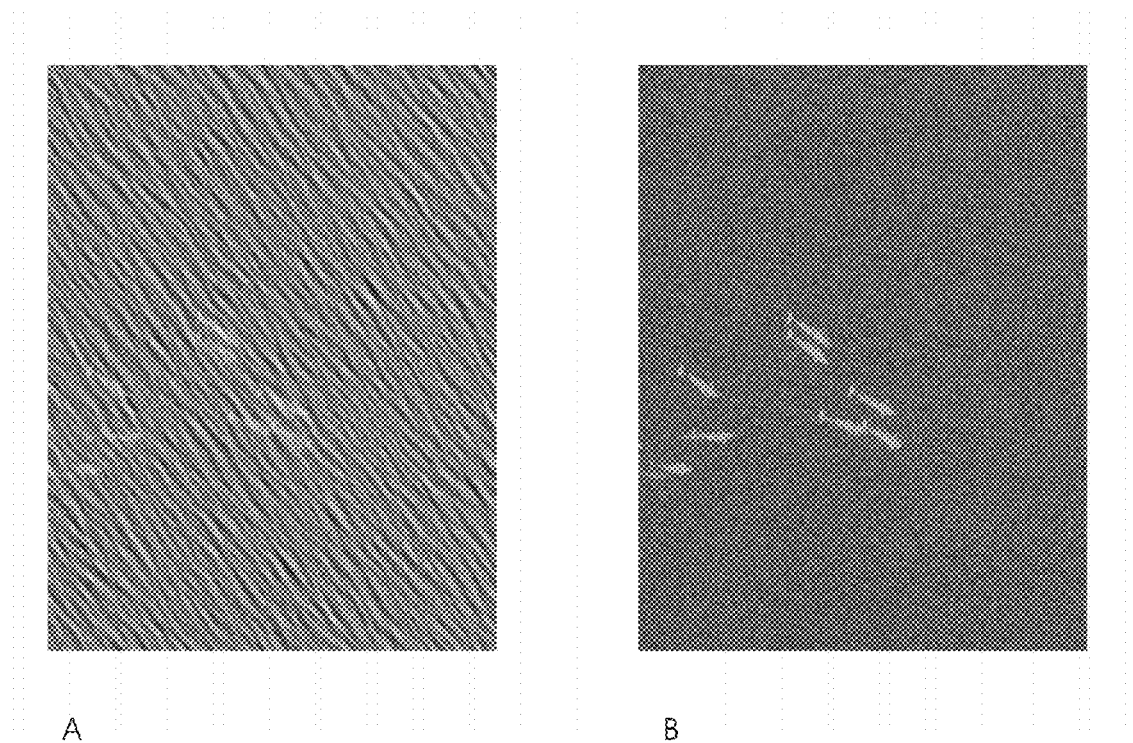
FIGS. 6A and B show before and after images for deglinting of an image of a sub-surface pod of beluga whales using a combination of water-penetrating and non-penetrating spectral-band images.
Figure 7:
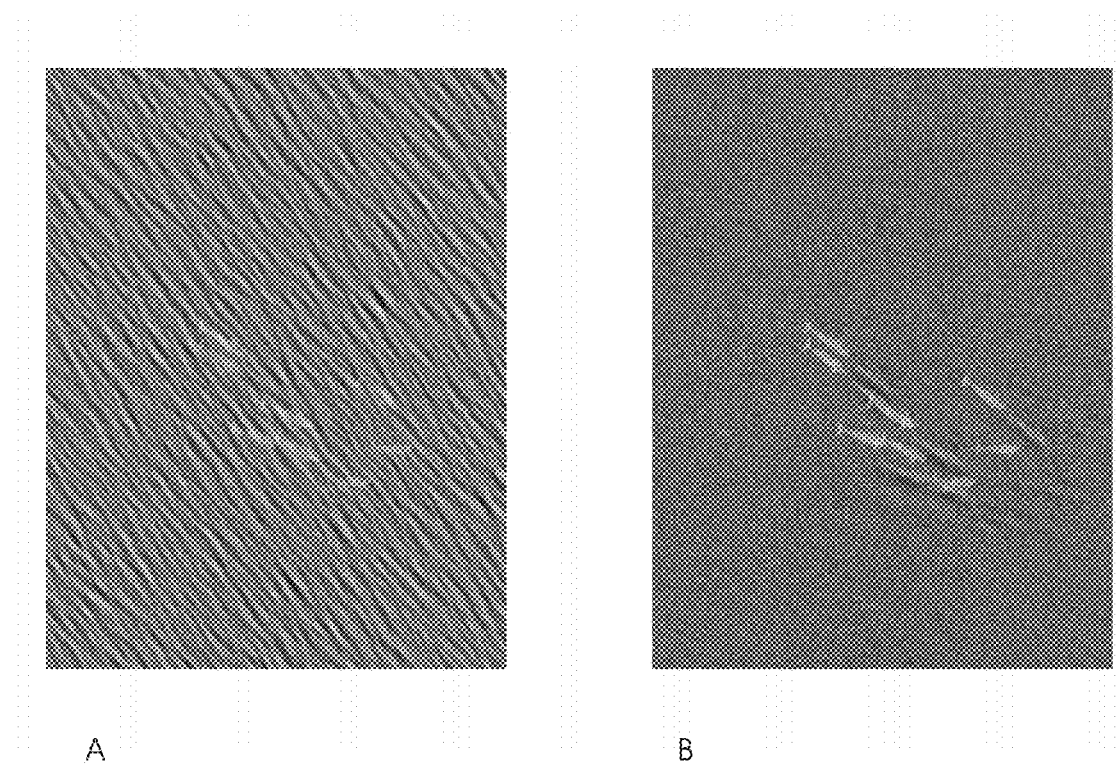
FIGS. 7A and B show before and after images for deglinting of an image of the same sub-surface pod of beluga whales using only water-penetrating spectral-band images.

FIGS. 5-7 use simulated ocean waves and submerged features to illustrate the deglinting process. FIG. 5 shows images of a coral reef viewed through ocean waves. FIG. 5A shows the unprocessed image. FIG. 5B shows the same image after deglinting. This simulation paired a penetrating and non-penetrating band. This result is a near perfect subtraction of the waves and greatly improved visibility of the coral reef.

FIG. 6 shows an image of a submerged beluga whale pod, again viewed through ocean waves. Camera noise was also added for realism. FIG. 6A shows the unprocessed image. FIG. 6B shows the same image after deglinting. This simulation also paired a penetrating and non-penetrating band and has near perfect subtraction of the waves and greatly improved visibility of the beluga whale pod.

FIG. 7 shows the same beluga whale pod, this time using two images from a single water-penetrating spectral band. FIG. 7A shows the unprocessed image. FIG. 7B shows the same image after deglinting, with $\beta(\vec{k})=1$. The $W(\vec{k})\Phi^{-1}$ terms introduce distortion due to the object being present in both images. However, the deglinted image shows complete subtraction of the waves and significant improvement in visibility of the whales over the input image.

The Advantages Over Prior Art

The innovative deglinting methods described herein improve over the prior art in that they account for time differences between the image pairs. An additional advantage is that deglinting can now use the same spectral band for both S and R. (This cannot be done with the prior deglinting algorithms.) Using a single spectral band is useful, for example, when only a single spectral band is available. For example, present day satellite panchromatic images have four times the resolution of multispectral images and can thus be used to detect smaller targets or improve target recognition. Commercial WorldView2 images are 0.5 m resolution in panchromatic images and 2 m resolution in multispectral images; thus there are 16 panchromatic pixels for each multispectral pixel. In order to perform deglinting using the higher-resolution panchromatic images, the only option is to use two time-separated panchromatic images. There are no simultaneously obtained images that would be suitable for prior art deglinting methods. An example is presented in FIG. 7 discussed above.

Another advantage is the ability to discriminate between good and bad wavenumbers for deglinting (see section entitled "The W mask" above). This can result in up to 3 dB increase in signal-to-noise ratio relative to deglinting in the prior implementations.

Besides good time alignment, deglinting performance requires knowing or estimating $\beta$ accurately. Prior implementations (see Kay et al., op cit.) use regression fitting between the S and R pixel radiances. The regression fit can be contaminated with non-wave reflected radiance such as bottom reflection, scattering in the water volume, and patches of surface surfactants. Eqns. 10 and 11 provide estimates of β specific to wavenumbers with wave energy and are thus much less likely to be contaminated.

Yet another advantage is that these methods of deglinting can be easily implemented together with the pixel-by-pixel determination of depth and currents as described in U.S. Pat. No. 8,903,134. Where depth and/or current are variable over an image pair, the determination of an accurate depth and/or current map can substantially improve deglinting while simultaneously providing a depth map and a current map as additional outputs. The many computational similarities between the deglinting computation and the depth/current mapping can be exploited to reduce computational complexity. A combined product can be produced with very few additional computations.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A method for deglinting comprising obtaining a first pair of images, $R(\vec{x})$ and $S(\vec{x})$, where $\vec{x}$ is the two-dimensional (2D) spatial coordinate for pixels in each image, wherein a majority of pixel intensities have a near-linear relationship to surface wave height of a body of water, wherein the two images of the first pair are spatially registered, and wherein there is a time interval between the two images of the first pair;

calculating a deglinted image using one of $$S'(\vec{x}) = \mathfrak{J}_2^{-1}[(F_S(\vec{k}) - W(\vec{k})\beta(\vec{k})F_R'(\vec{k}))] \text{ (the "Fourier transform" formula)}$$

or $$S'(\vec{x}) = (S(\vec{x}) - b(\vec{x})*\vec{\omega}(\vec{x})*\psi*R(\vec{x}) \text{ (the "convolution" formula)},$$

where $\mathfrak{J}_2^{-1}$ is the inverse 2D Fourier transform operator, $F_S(\vec{k}) = \mathfrak{J}_2(S(\vec{x}))$, $F_R(\vec{k}) = \mathfrak{J}_2(R(\vec{x}))$, $\mathfrak{J}_2$ is the 2D Fourier transform operator, $\vec{k}$ is the 2D frequency coordinate for a 2D Fourier transform of an image, $F_R' = \Phi^{-1}F_R$ propagates $F_R$ to the time of $F_S$, $W(\vec{k})$ is a wavenumber mask restricting subtraction to wavenumbers with significant wave energy, $\vec{\omega}(\vec{x}) = \mathfrak{J}_2^{-1}(W(\vec{k}))$,

* is the convolution operator, $\beta(\vec{k})$ is the ratio of the ocean surface reflected radiance in S relative to the radiance in R, which may be a constant or a function of $\vec{k}$, $b(\vec{x})$ is also the ratio of ocean surface reflected radiance in S relative to the radiance in R, which may be a constant or a function of $\vec{x}$, $\Phi^{-1}$ is a gravity wave propagation function, $\psi*R(\vec{x})$ propagates waves in $R(\vec{x})$ to the time of $S(\vec{x})$, $\Phi^{-1}$ and $\psi$ are each functions of the depth, surface current (velocity) vector, and wave direction at each pixel location in said first pair of images, printing said deglinted image $S'(\vec{x})$ or displaying said deglinted image $S'(\vec{x})$ on an image display device.

2. The method of claim 1, wherein the deglinted image is calculated using the Fourier transform formula, and the gravity wave propagation function is given by $$\Phi^{-1}(d(\vec{x}), \vec{u}(\vec{x})) = e^{\pm i\omega_0(\vec{k}|d(\vec{x}), \vec{u}(\vec{x}))\tau}$$

where $$\omega_0(\vec{k}|d(\vec{x}), \vec{u}(\vec{x})) = \sqrt{g|k|\tanh(|k|d(\vec{x}))} - \vec{k}\cdot\vec{u}(\vec{x}),$$

$\tau$ is the time difference between $R(\vec{x})$ and $S(\vec{x})$, $d(\vec{x})$ is the depth at location $\vec{x}$, $\vec{u}(\vec{x})$ is the current at location $\vec{x}$, g is Earth gravitational acceleration (9.81 m/s$^2$), and ± indicates one of two possible wave directions, selected on a pixel-by-pixel basis.

3. The method of claim 2, further comprising obtaining the depth $d(\vec{x})$ from externally supplied data.

4. The method of claim 3, wherein the depth is assumed to be constant and independent of $\vec{x}$.

5. The method of claim 2, further comprising discretizing the depth $d(\vec{x})$ into a set of K depth bands where K<<N, and N is the number of pixels in $R(\vec{x})$ and $S(\vec{x})$.

6. The method of claim 2, further comprising calculating independent values of the depth $d(\vec{x})$ for every pixel location from a pair of images wherein each image pixel has an intensity substantially proportional to wave height.

7. The method of claim 2, further comprising obtaining the current $\vec{u}(\vec{x})$ from externally supplied data.

8. The method of claim 2, wherein the current is assumed to be constant and independent of $\vec{x}$.

9. The method of claim 2, further comprising calculating independent values of the current $\vec{u}(\vec{x})$ for every pixel location from a pair of images wherein each image pixel has an intensity substantially proportional to wave height.

10. The method of claim 2, further comprising obtaining wave direction from externally supplied data.

11. The method of claim 2, wherein the wave direction is assumed to be constant and independent of $\vec{x}$.

12. The method of claim 2, further comprising calculating independent values of the wave direction for every pixel location from a pair of images wherein each image pixel has an intensity substantially proportional to wave height.

13. The method of claim 2, further comprising replacing the input image $R(\vec{x})$ according to $$R(\vec{x}) \leftarrow R(\vec{x} + \tau\vec{u}(\vec{x}))$$

before the deglinted image is calculated.

14. The method of claim 1, wherein if the depth and current are substantially constant over $\vec{x}$, the method further comprising calculating $\beta(\vec{k})\Phi^{-1}$ as the complex transfer function between R and S, $$\beta(\vec{k})\Phi^{-1} = \frac{\langle F'_R(\vec{k})\rangle}{\langle F_S(\vec{k})\rangle}.$$

15. The method of claim 1, further comprising calculating $\beta(\vec{k})$ as the magnitude transfer function between R and S, $$\beta(\vec{k}) = \left|\frac{\langle F'_R(\vec{k})\rangle}{\langle F_S(\vec{k})\rangle}\right|.$$

16. The method of claim 15, further comprising replacing $\beta(\vec{k})$ with an average value of $\beta(\vec{k})$, averaged over wavenumbers with significant wave energy according to wavenumber mask $W(\vec{k})$:

$$\beta \leftarrow \langle \beta(\vec{k})\rangle_W.$$

17. The method of claim 1, further comprising calculating $W(\vec{k})$ by $$W(\vec{k}) = \begin{cases} 1 \text{ for } |\gamma(\vec{k})| > 0.7 \\ 0 \text{ for } |\gamma(\vec{k})| \leq 0.7 \end{cases}$$

where $|\gamma(\vec{k})| = \frac{|\langle F'_R(\vec{k})F_S(\vec{k})\rangle|}{|\langle F'_R(\vec{k})\rangle||\langle F_S(\vec{k})\rangle|}.$ 18. The method of claim 1, further comprising calculating $W(\vec{k})$ by $$W(\vec{k}) = \begin{cases} 1 \text{ for } \theta_{low} < \mathrm{atan}\left(\frac{k_y}{k_x}\right) < \theta_{high},\ k_{low} < |k| < k_{high} \\ 0 \text{ for all other values of } \mathrm{atan}\left(\frac{k_y}{k_x}\right) \text{ and } |k| \end{cases}$$

where $\theta_{low}$, $\theta_{high}$, $k_{low}$, $k_{high}$ define a wavenumber pass band for wavenumber direction and magnitude.

19. A non-transitory computer-readable medium with instructions stored thereon, that when executed by a processor, perform the method of claim 1.

20. A system for producing a deglinted image comprising
an imaging system operable to obtain images of a body of water,
a computing machine configured to implement the method of claim 1, and
a printer or an image display device operable to display said deglinted image.

* * * * *